United States Patent
Ishida et al.

(10) Patent No.: US 7,529,000 B2
(45) Date of Patent: May 5, 2009

(54) IMAGE READING APPARATUS AND IMAGE PRINTING APPARATUS USING THE SAME

(75) Inventors: Yasushi Ishida, Tokyo (JP); Shigeyuki Sugiyama, Hiratsuka (JP); Katsumi Obana, Funabashi (JP); Takayuki Nishinohara, Tokyo (JP); Hiroyuki Noguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 11/032,037

(22) Filed: Jan. 11, 2005

(65) Prior Publication Data

US 2005/0157354 A1    Jul. 21, 2005

(30) Foreign Application Priority Data

Jan. 21, 2004    (JP)    ............................. 2004-013104

(51) Int. Cl.
*H04N 1/00*     (2006.01)
(52) U.S. Cl. .................. 358/474; 358/487; 358/496; 358/468; 358/497; 399/379
(58) Field of Classification Search ............... 358/487, 358/497, 474, 509, 475, 494, 486, 496, 493, 358/468; 250/234, 235; 355/50; 348/96; 399/377, 378, 379, 380
See application file for complete search history.

(56) References Cited

U.S. PATENT DOCUMENTS

| | | | | |
|---|---|---|---|---|
| 4,987,441 A * | 1/1991 | Hudspeth | ...................... | 355/50 |
| 5,495,329 A * | 2/1996 | Anderson et al. | ............ | 356/218 |
| 5,717,500 A * | 2/1998 | Ikeda et al. | .................. | 358/449 |
| 5,745,248 A | 4/1998 | Nickerson | | |
| 5,767,945 A | 6/1998 | Fields et al. | .................. | 355/39 |
| 5,780,829 A | 7/1998 | Tsai et al. | .................... | 235/454 |
| 5,781,311 A * | 7/1998 | Inoue et al. | .................. | 358/475 |
| 5,907,413 A * | 5/1999 | Han | ........................... | 358/497 |
| 6,052,174 A | 4/2000 | Terajima et al. | ................ | 355/67 |
| 6,222,613 B1 * | 4/2001 | Haraguchi et al. | ............ | 355/40 |
| 6,239,817 B1 | 5/2001 | Meyer | .......................... | 347/36 |

(Continued)

FOREIGN PATENT DOCUMENTS

CN          2278971       4/1998

(Continued)

OTHER PUBLICATIONS

"Epson Expression 1600 User's Guide", 2000, Epson America, Inc. pp. 20, 53, 57, 58, 93-96, 101, 102, 104, 109, 110, 133, 134.*

(Continued)

*Primary Examiner*—Kimberly A Williams
(74) *Attorney, Agent, or Firm*—Fitzpatrick, Cella, Harper & Scinto

(57) ABSTRACT

In an image reading apparatus which can read a transparent original and reflection original, a white background is formed like a sheet. The image reading apparatus is arranged to be movable by a pair of rollers which rotate using, e.g., the driving source of an original feeder. To read a transparent original, the white sheet is moved by the pair of rollers to a position where a transparent original reading illumination unit is exposed. This makes it possible to eliminate trouble in detaching the white background mounted on the back of an original platen in accordance with the type of an original to be read.

8 Claims, 14 Drawing Sheets

U.S. PATENT DOCUMENTS

| | | | |
|---|---|---|---|
| 6,297,874 B1 | 10/2001 | Ikeda et al. | 355/40 |
| 6,411,324 B1 | 6/2002 | Christiansen et al. | 347/248 |
| 6,415,115 B1 | 7/2002 | Moritani | 399/82 |
| 6,417,937 B1 * | 7/2002 | Batten et al. | 358/487 |
| 6,608,707 B1 * | 8/2003 | Han | 358/497 |
| 6,612,240 B1 | 9/2003 | Silverbrook et al. | 101/424.1 |
| 6,614,563 B1 * | 9/2003 | Batten et al. | 358/487 |
| 6,795,203 B1 * | 9/2004 | Akahane et al. | 358/1.1 |
| 6,982,809 B2 | 1/2006 | Kagaya | 358/1.18 |
| 7,002,712 B2 | 2/2006 | Barker et al. | 358/474 |
| 7,092,131 B2 * | 8/2006 | Fang | 358/474 |
| 7,110,150 B2 * | 9/2006 | Tecu et al. | 358/487 |
| 7,149,010 B2 * | 12/2006 | Tecu et al. | 358/487 |
| 7,149,012 B2 * | 12/2006 | Fang et al. | 358/497 |
| 2002/0051242 A1 | 5/2002 | Han et al. | 358/474 |
| 2003/0063333 A1 * | 4/2003 | Boll | 358/494 |
| 2003/0184820 A1 * | 10/2003 | Han et al. | 358/494 |
| 2003/0202222 A1 | 10/2003 | Amimoto et al. | |
| 2004/0040672 A1 * | 3/2004 | Nagar | 160/98 |
| 2004/0061905 A1 | 4/2004 | Ohara | 358/402 |
| 2004/0246543 A1 | 12/2004 | Kurokawa et al. | 358/509 |
| 2005/0036178 A1 * | 2/2005 | Pai | 358/474 |
| 2005/0157353 A1 | 7/2005 | Nishinohara et al. | 358/474 |
| 2005/0179960 A1 | 8/2005 | Obana et al. | 358/449 |
| 2005/0190412 A1 | 9/2005 | Noguchi et al. | 358/474 |
| 2007/0229919 A1 * | 10/2007 | Shinagawa | 358/486 |
| 2007/0247689 A1 * | 10/2007 | Oguchi | 359/197 |
| 2007/0252069 A1 * | 11/2007 | Oguchi | 248/458 |

FOREIGN PATENT DOCUMENTS

| | | |
|---|---|---|
| CN | 2299426 Y | 12/1998 |
| CN | 1453738 | 11/2003 |
| EP | 724181 A2 * | 7/1996 |
| EP | 977421 A2 * | 2/2000 |
| EP | 1385328 A1 * | 1/2004 |
| GB | 2333922 A * | 8/1999 |
| JP | 64-47155 | 3/1989 |
| JP | 03-62668 | 3/1991 |
| JP | 6-5251 | 1/1994 |
| JP | 06-46219 | 2/1994 |
| JP | 8-331494 | 12/1996 |
| JP | 10-126578 | 5/1998 |
| JP | 10-224528 | 8/1998 |
| JP | 10-233920 | 9/1998 |
| JP | 2000-358132 | 12/2000 |
| JP | 2001-265547 | 9/2001 |
| JP | 2001-313784 | 11/2001 |
| JP | 2002-77539 | 3/2002 |
| JP | 2003-5304 | 1/2003 |
| JP | 2003-75944 | 3/2003 |
| JP | 2003-110844 | 4/2003 |
| JP | 2003-202633 | 7/2003 |
| JP | 2003-303065 | 10/2003 |
| JP | 2003-305925 | 10/2003 |
| JP | 2004-5559 | 1/2004 |
| JP | 2004-7547 | 1/2004 |

OTHER PUBLICATIONS

Tuijin, "An adaptive approach to negative scanning", Proceedings of the SPIE. Oct. 1996, vol. 2949, p. 281-290.*

Shaw et al.; "Printability study of opaque and transparent defects using standard and modified illumination" Proceedings of the SPIE. Feb. 1995, vol. 2440, p. 878-890.*

* cited by examiner

F I G. 9
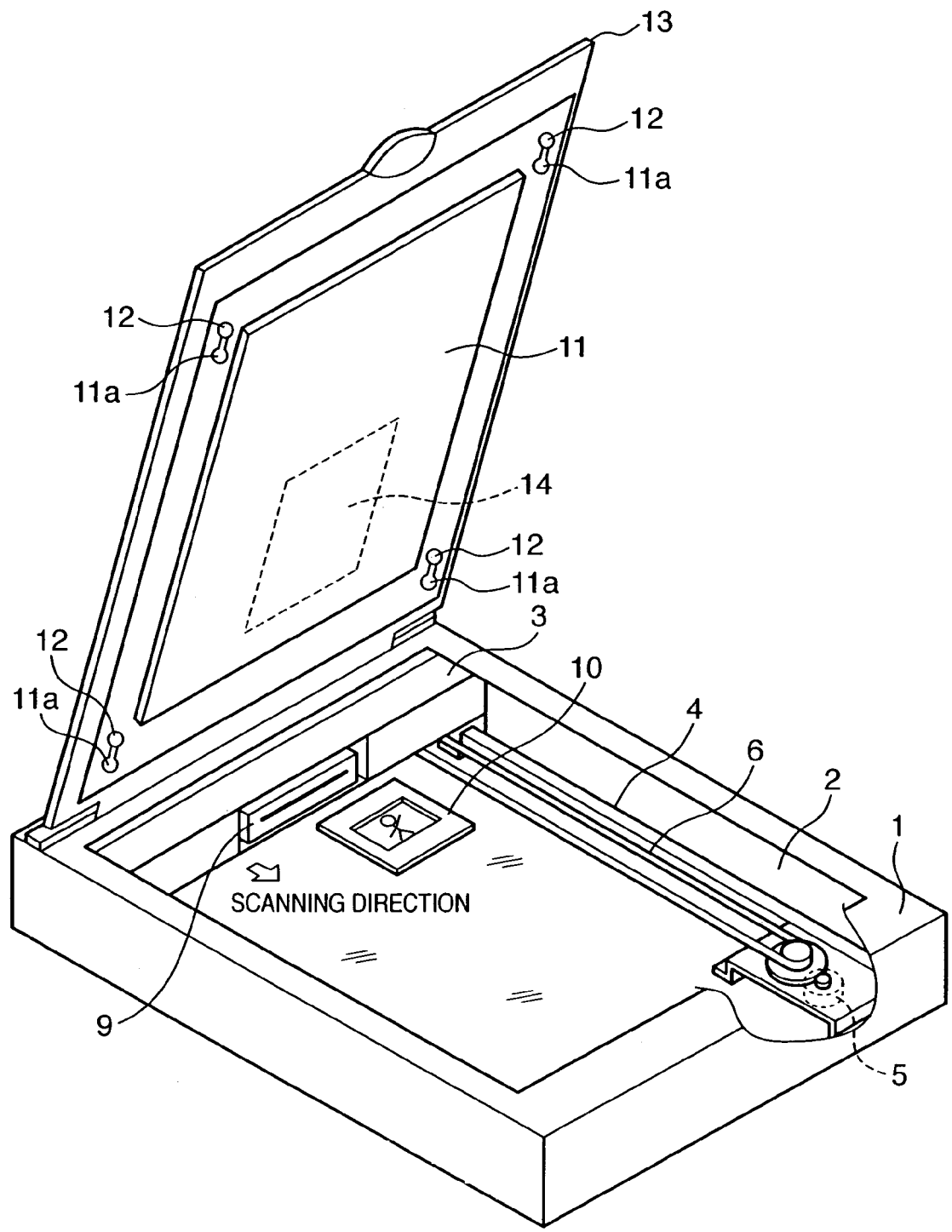

IMAGE READING APPARATUS AND IMAGE PRINTING APPARATUS USING THE SAME

FIELD OF THE INVENTION

The present invention relates to an image reading apparatus such as an image scanner or the like and, more particularly, to an image reading apparatus which can read both a reflection original and transparent original. The present invention also relates to an image printing apparatus which comprises the image reading apparatus.

BACKGROUND OF THE INVENTION

As an example of a conventional image reading apparatus, there is known a flatbed scanner which can read both a reflection original and transparent original (see, e.g., Japanese Patent Laid-Open No. 2001-313784). FIG. 9 shows an example of such flatbed scanner.

To read a reflection (paper) original set on an original table glass 2, an optical unit 3 which is arranged inside the original table glass 2 and can read an original line by line is linearly moved in the scanning direction using a guide member such as a guide shaft 4 or the like.

The optical unit 3 is attached to a timing belt 6 engaged with a driving motor 5. The optical unit 3 moves in the scanning direction upon rotation of the driving motor 5.

As shown in FIG. 4, an image of an original is guided to a lens 8 by a plurality of mirrors 7a, 7b, 7c, and 7d inside the optical unit 3. The lens 8 forms the image of the original on a photoelectric conversion element 9 such as a CCD or the like. The formed image of the original is converted into electrical signals by the photoelectric conversion element 9.

In the flatbed scanner shown in FIG. 9, an illumination unit 14 for reading a transparent original is incorporated in an original platen 13. FIG. 5 is a sectional view showing an example of the arrangement of the illumination unit 14. The illumination unit 14 is fixed on the back of the original platen 13 and comprises an illumination lamp 15, reflecting sheet 16, light guide member 17, light diffusion sheet 18, inverter circuit (not shown), and the like. The illumination unit 14 has a known arrangement as a sidelight-type surface light source device. A light beam emitted from the illumination lamp 15 is finally diffused by the light diffusion sheet 18 on the light-emitting surface of the light guide member 17 and exits downward, thereby forming planar illumination light.

To read a transparent original (negative or positive film), an original platen white background 11 for reflection original reading which is so attached as to cover the illumination unit 14 is first removed, and a transparent original 10 is set below the illumination unit 14. Sheet-like light is applied by the illumination unit 14 from above the transparent original, and the light having passed through the original is photoelectrically converted by the optical unit 3 inside the platen glass 2.

As described above, the user needs to remove the original platen white background 11 every time he/she wants to read the transparent original 10 such as a film or the like by a conventional image reading apparatus. This is very troublesome.

To ease a problem in attachment/detachment, in some cases, holes 11a to be hooked are formed in the original platen white background 11, and projections 12 corresponding to the holes 11a to be hooked are formed at the back of the original platen 13, as shown in FIG. 9. With this arrangement, by engaging the projections 12 in the holes 11a to be hooked, the original platen white background 11 (to be also referred to as the white background 11 hereinafter) can be attached/detached relatively easily. However, if attachment/detachment of the original platen white background 11 is repeated, the holes 11a to be hooked may break.

There is also proposed a method of providing a base resin member having a thickness of about 2 mm as the backing of the white background 11 and fitting the resin member into a fitting unit for attachment on the back of the platen (see, e.g., Japanese Patent Laid-Open No. 2003-75944). However, this method requires an additional cost of providing the base. Also, the method increases the size of the platen, thus increasing the size of the entire apparatus.

If the white background 11 is detachable, and the detached white background 11 is carelessly placed on, e.g., a dirty desk, the white background 11 becomes dirty. If the user inadvertently places the white background 11 on a sharp-pointed projection, the surface of the white background 11 may be damaged or may be broken at worst.

SUMMARY OF THE INVENTION

The present invention has been made in consideration of the above-mentioned problems, and has as its main object to provide an image reading apparatus which can read a transparent original and reflection original, wherein trouble in detaching a white background mounted on the back of an original platen can be saved in accordance with the type of an original to be read, and an image printing apparatus using the image reading apparatus.

An image reading apparatus which can read a reflection original and transparent original, comprising: an original table; an original pressure unit having an illumination unit which can irradiate a predetermined region of the original table from above; a sheet member so arranged as to cover a surface on which the illumination unit of the original pressure unit is arranged; and a movement unit adapted to cause the sheet member to move between a first position where the illumination unit is exposed and a second position where the illumination unit is hidden.

A control method for an image reading apparatus which can read a reflection original and transparent original, wherein the image reading apparatus comprises an original table, an original pressure unit having an illumination unit which can irradiate a predetermined region of the original table from above, and a movement unit adapted to move a sheet member so arranged as to cover a surface on which the illumination unit of the original pressure unit is arranged, and the method comprises a step of causing the movement unit adapted to move the sheet member between a first position where the illumination unit is exposed and a second position where the illumination unit is hidden.

Other objects and advantages besides those discussed above shall be apparent to those skilled in the art from the description of a preferred embodiment of the invention which follows. In the description, reference is made to accompanying drawings, which forms a part therefor, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a schematic perspective view of a conventional image reading apparatus;

DETAILED DESCRIPTION OF THE PREFERRED EMBODIMENTS

First Embodiment

Figure 1:
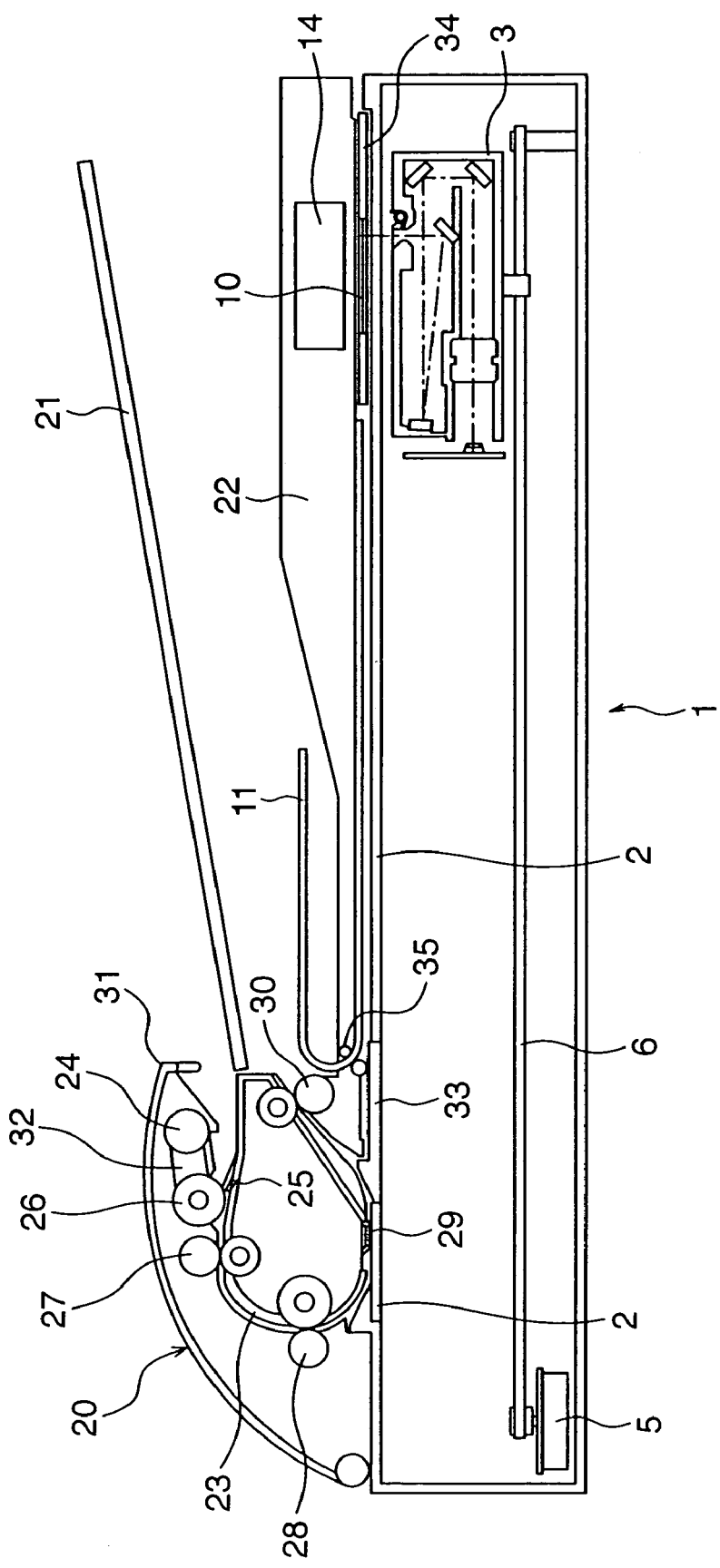
FIGS. 1 and 2 are schematic sectional views of an image reading apparatus according to the first embodiment of the present invention.

Preferred embodiments of the present invention will now be described in detail in accordance with the accompanying drawings.

Note that the dimensions, materials, shapes, relative positions, and the like of the components described in the embodiment below are merely examples. The scope of the present invention is not limited to these, unless otherwise specified.

The same reference numerals in the accompanying drawings denote the same members as those in the drawings used in the description of the prior art and those in the foregoing drawings.

Figure 2:
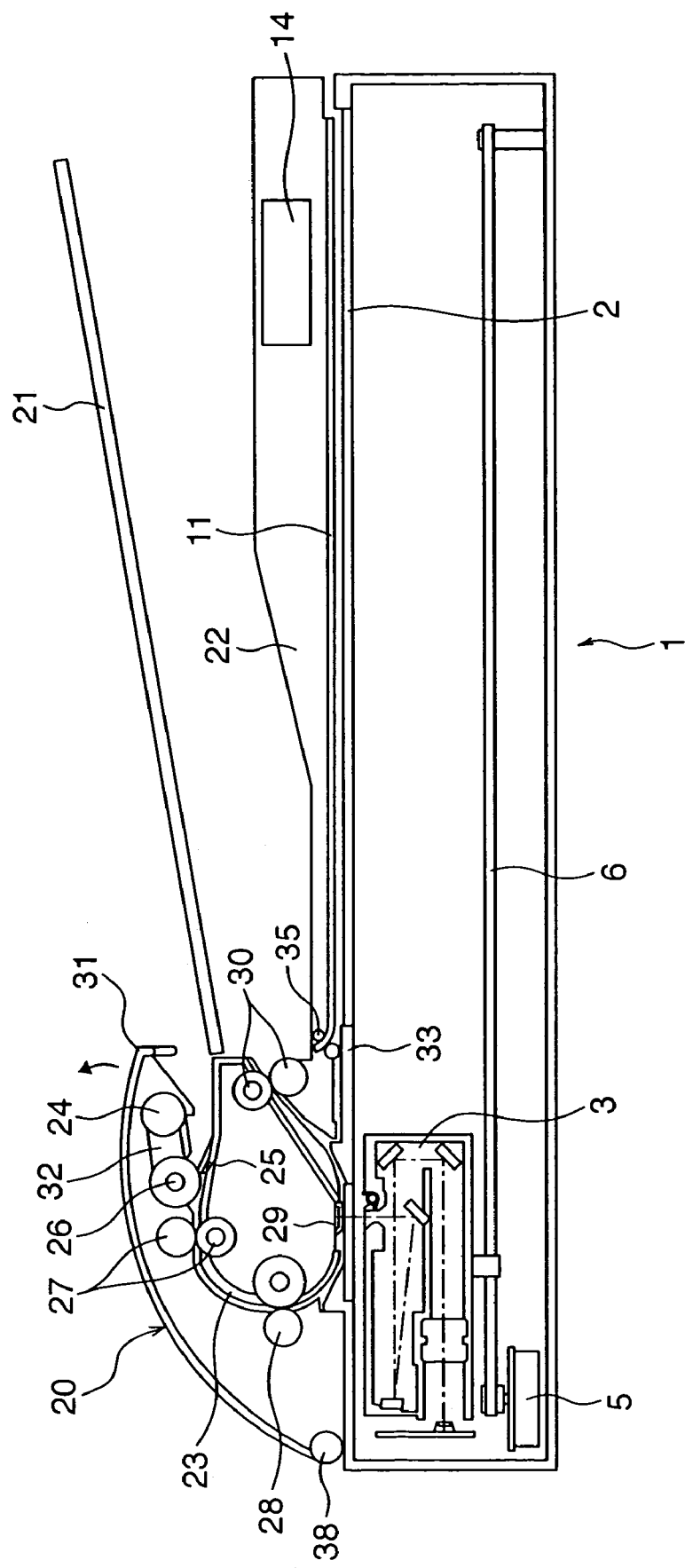

FIGS. 1 and 2 are views showing examples of the schematic structure of an image reading apparatus according to the first embodiment of the present invention.

Figure 5:
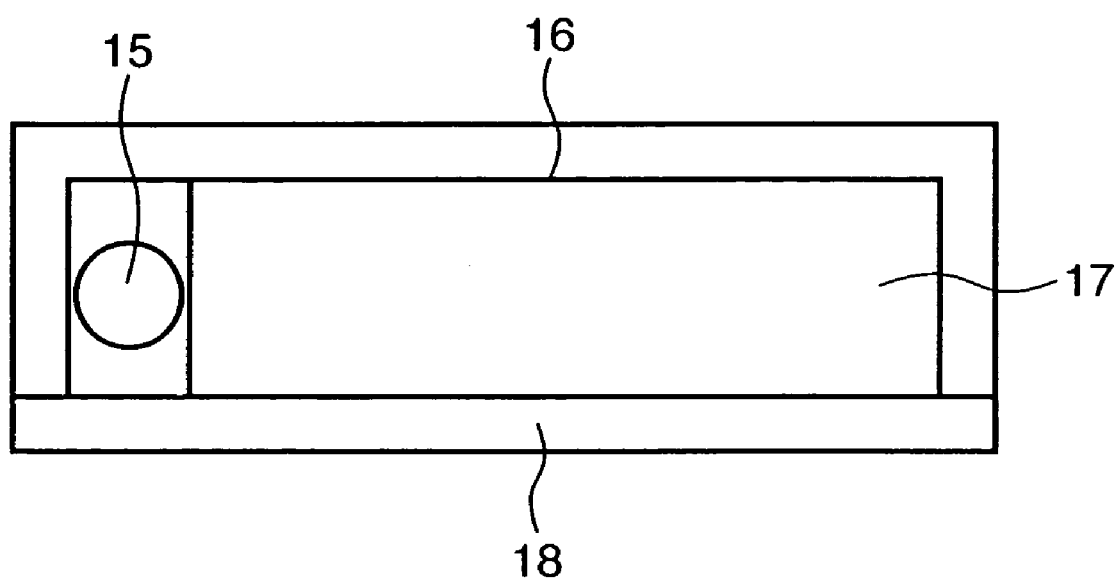
FIG. 5 is a schematic sectional view of an illumination unit of the image reading apparatus according to the embodiment of the present invention.

The image reading apparatus according to this embodiment has an illumination unit 14 as shown in FIG. 5, similarly to the above-mentioned image reading apparatus. A reflecting sheet 16 is arranged on the back of a light guide member 17, and a light diffusion sheet 18 is arranged on the irradiation surface. Light rays emitted from an illumination lamp 15 serving as a cold cathode lamp pass though the light guide member 17, reflecting sheet 16, and light diffusion sheet 18 and are uniformly applied to a transparent original set on a platen glass 2 serving as an original table.

The illumination unit 14 is attached to the back of an original platen 13, and a sponge is affixed to the back of a platen white background 11 to bring the original into tight contact with the surface of the platen glass 2.

An automatic original feeder 20 comprises a feed tray 21 which can be loaded with a plurality of original sheets, a feed unit which feeds the original sheets on the feed tray 21 one by one onto the platen glass 2 serving as the original table, a convey unit which causes the original to pass along the upper surface of the platen glass 2, a delivery unit which receives the original having passed along the upper surface of the platen glass 2 and delivers it outside, and a delivered paper loader 22 which accommodates the read original delivered from the delivery unit. The feeding, conveyance, and delivery of the original are performed by a motor M (FIG. 6) provided in the original feeder.

Referring to FIGS. 1 and 2, reference numeral 1 denotes an image reading apparatus; and 20, the original feeder attached to the upper portion of the image reading apparatus 1. The original feeder 20 is attached to the upper portion of the image reading apparatus 1 so as to be opened, closed, and pivoted freely. The original feeder 20, particularly, its delivered paper loader 22 also serves as the platen of an original in setting the original on the platen glass 2 and reading it.

The delivered paper loader 22 incorporates the illumination unit 14 described above. An almost U-shaped original convey guide (to be referred to as a U-turn path hereinafter) 23 is provided inside the original feeder 20. The feed tray 21 is so arranged as to connect to the upstream side of the U-turn path 23. The delivered paper loader 22 is so arranged as to connect to the downstream side of the U-turn path 23.

On the upstream side of the U-turn path 23, a pickup roller 24 which abuts against the top sheet of an original loaded on the feed tray 21 and pulls in the original, a separation pad 25 constituting a separation unit which separates one sheet from the original pulled in by the pickup roller 24, a separation roller 26 serving as a separation convey member which comes into tight contact with the separation pad 25, an original stopper (not shown) which controls the leading edge position of the original loaded on the feed tray 21, and an original presence/absence sensor (not shown) which detects the presence/absence of the original are provided.

On the downstream side of the U-turn path 23, a pair of original delivery rollers 30 for delivering the original onto the delivered paper loader 22 and an original edge sensor (not shown) which detects the leading edge and trailing edge of each original sheet are provided.

In FIGS. 1 and 2, reference numerals 27 and 28 denote a pair of first convey rollers and a pair of second convey rollers, respectively, provided in the U-turn path 23 to convey the original; and 31, an upper cover so arranged as to be opened/closed freely about a shaft 38. For example, if an original jam occurs, the upper cover 31 can be opened to remove the jammed original.

A reference numeral 32 denotes a pickup arm which holds the pickup roller 24 such that the pickup roller 24 can be rotated freely and can be brought into contact with/separated from the original loaded on the feed tray 21. To pull in the original, the pickup arm 32 is pivoted downward to make the pickup roller 24 abut against the original. Note that when the pickup arm 32 is pivoted downward, the original stopper (not shown) is pressed down by the pickup arm 32.

In FIGS. 1 and 2, the image reader 1 comprises an optical unit 3 which is so arranged as to move below the platen glass 2 in the lateral direction with respect to FIGS. 1 and 2 and reads an original set on the platen glass 2.

The optical unit 3 can perform reading using, as a unit, an area (line) which is relatively narrow in the widthwise direction of the platen glass 2 (direction perpendicular to the sheet surface). To read a fixed original (original set on the platen glass 2 without the original feeder 20), the optical unit 3 irradiates the reflection original by an internal linear light source and reads an image of the original while moving in the lateral direction with respect to FIGS. 1 and 2. To read an original (moving original) conveyed by the original feeder 20, the optical unit 3 remains still at a position shown in FIG. 2 (reading position) and reads the original in the same manner.

In the original feeder 20 according to this embodiment, an original is set such that the leading edge of the original faces leftward with respect to the original feeder 20 in FIGS. 1 and 2 and that an image surface can be viewed (the image surface faces upward with respect to FIGS. 1 and 2). As described above, the leading edge position of the original is controlled by the original controlling surface of the original stopper (not shown), and the original presence/absence sensor (not shown) can detect the presence/absence of the original.

When the operator gives an instruction to start reading a reflection original in the image reading apparatus 1 through an operation unit (not shown) or an external device such as a computer or the like connected to the image reading apparatus 1, a driving unit (not shown) rotates to pivot the pickup arm 32 downward, and the original stopper is pressed down by the pickup arm 32. After that, the pickup roller 24 abuts against the top sheet of the original loaded on the feed tray 21 and pulls in the top sheet.

The top original sheet passes along the inclined surface of the original stopper, is separated from the remaining sheets by the separation roller 26 and separation pad 25, and is fed into the U-turn path 23. The original sheet having been fed into the U-turn path 23 is conveyed by the pair of first convey rollers 27 along the U-turn path 23 and is further conveyed by the pair of second convey rollers 28 to the reading position where the optical unit 3 reads image information.

After that, when the original edge sensor detects the leading edge of the original sheet, and the leading edge is conveyed from the detected position by a predetermined distance, the optical unit 3 starts reading an image. At this time, the original sheet is pressed by a reading white plate 29. After the start of reading, the original sheet is guided by a jump table 33 and guided to the pair of original delivery rollers 30.

When the original edge sensor detects the trailing edge of the original sheet, and the trailing edge is conveyed from the detected position by a predetermined distance, the optical unit 3 ends reading the image. The original sheet having been read is conveyed toward the delivered paper loader 22 by the pair of original delivery rollers 30 and is delivered onto the delivered paper loader 22.

When the trailing edge of the delivered original sheet passes the pair of original delivery rollers 30, the original sheet falls freely and is accommodated in the delivered paper loader 22. The image reading apparatus 1 repeats the above-mentioned reading operation until the original presence/absence sensor detects the absence of original sheets.

Figure 6:
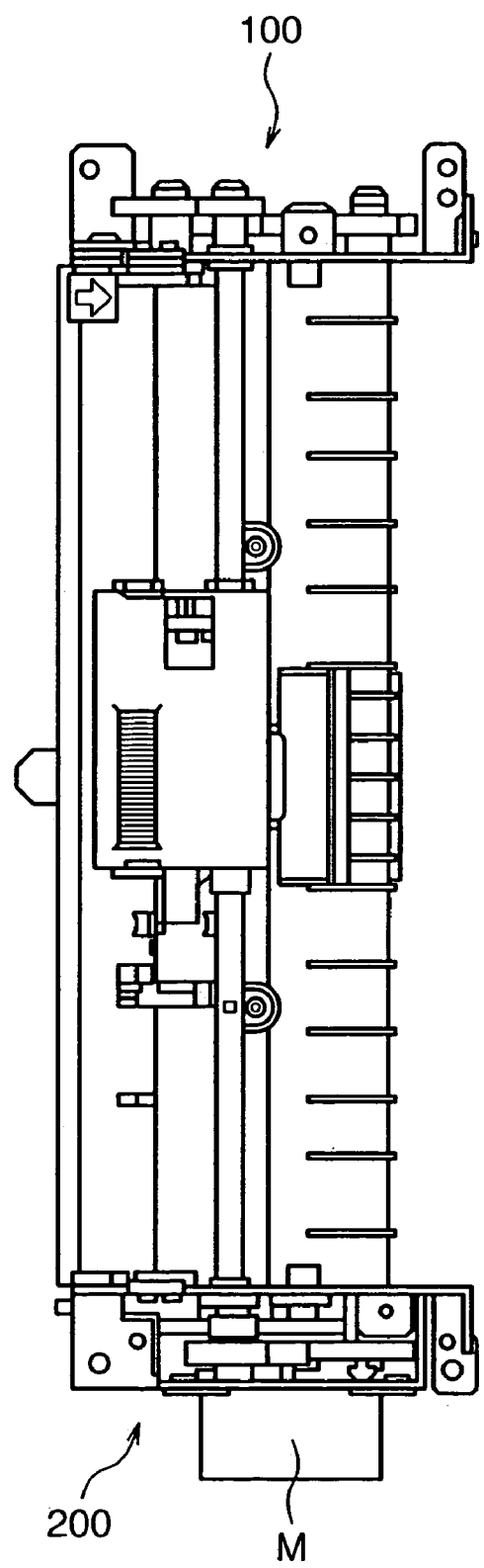
FIG. 6 is a layout view of driving systems of an original feeder according to the first embodiment.
Figure 7:
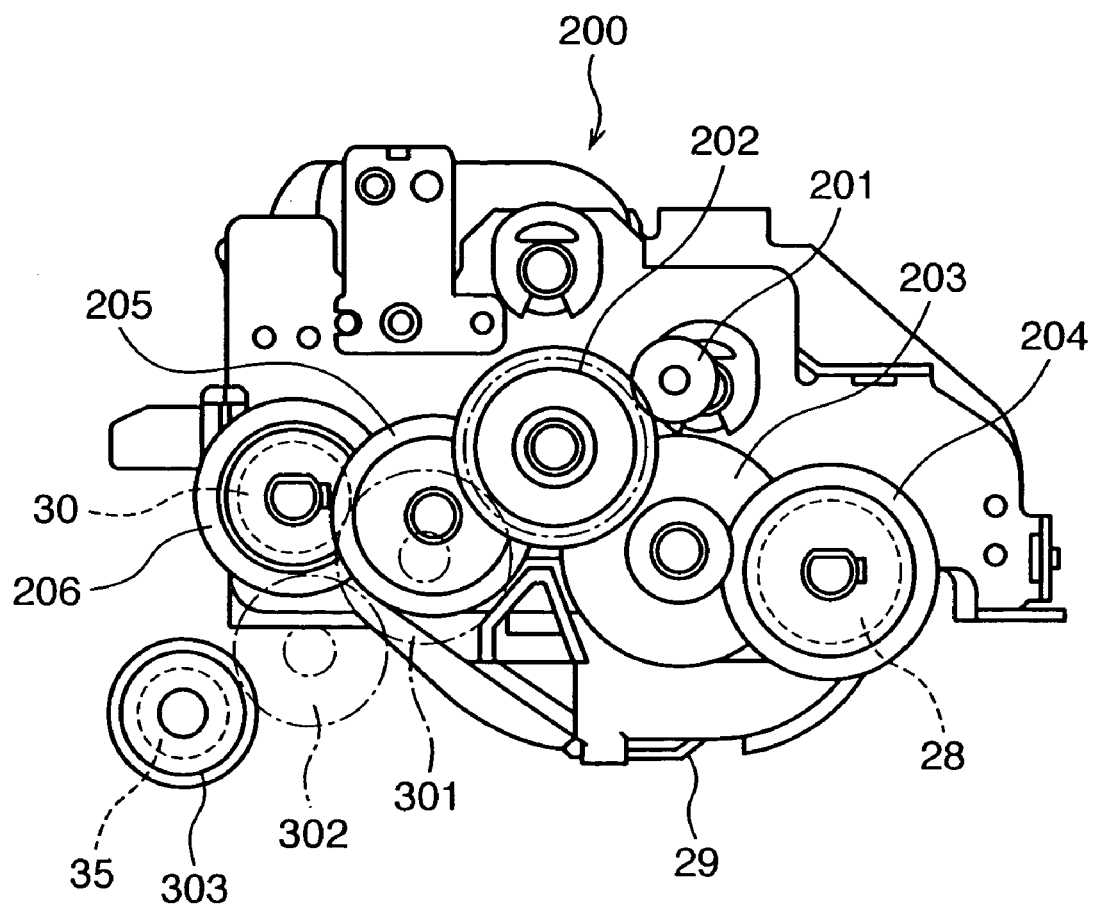
FIG. 7 is a view of a reading control driving unit of the original feeder according to the first embodiment.
Figure 8:
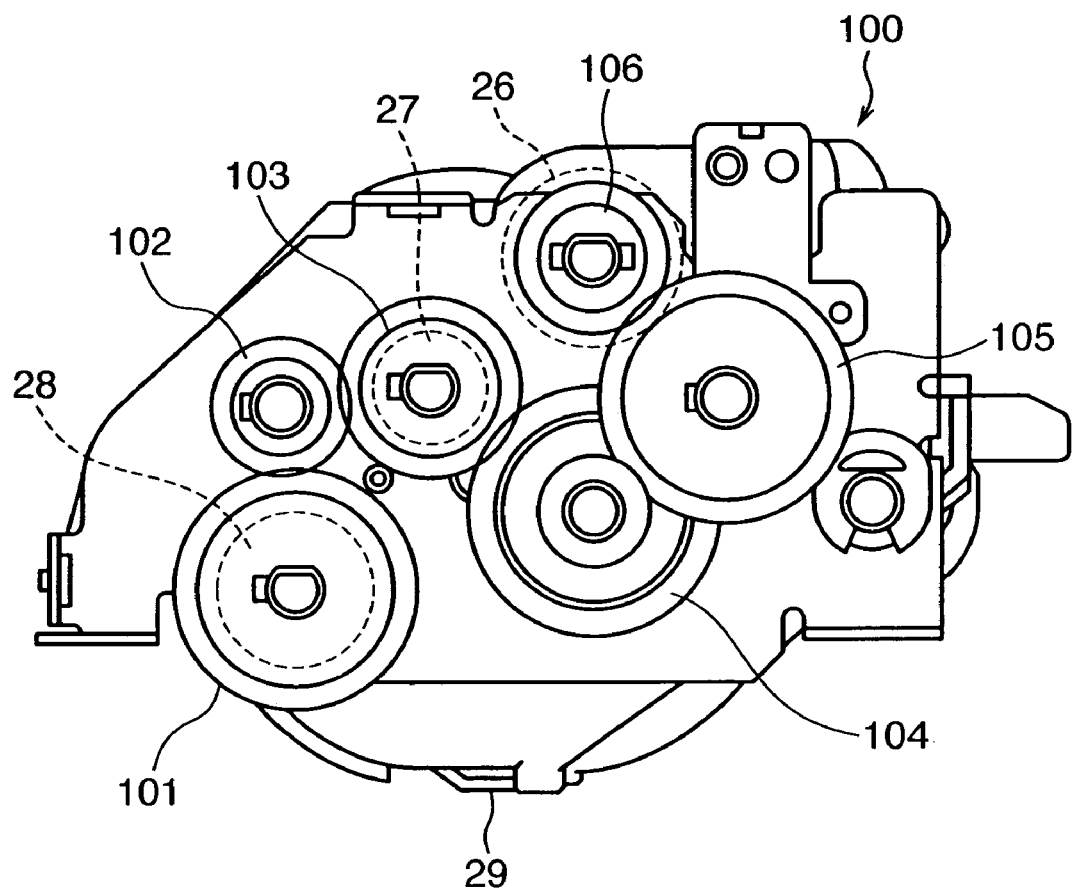
FIG. 8 is a view of a separation conveyance driving unit of the original feeder according to the first embodiment.

The layout of the driving systems of the original feeder 20 will be described in detail with reference to FIGS. 6 to 8. As shown in FIG. 6, the driving systems are arranged at the two ends in the widthwise direction of the original feeder 20. In FIG. 6, reference numeral 200 denotes a reading conveyance control driving unit; and 100, a separation conveyance driving unit. Reference symbol M denotes the driving motor. As can be seen from FIG. 6, the reading conveyance control driving unit 200 is a driving transmission unit on a side where the driving motor M is arranged while the separation conveyance driving unit 100 is a driving transmission unit on a side opposite to the side of the driving motor M.

The reading conveyance control driving unit 200 will be described with reference to FIG. 7. FIG. 7 corresponds to an end on the back which is hidden in FIGS. 1 and 2. Broken lines in FIG. 7 indicate the second convey roller 28 and original delivery roller 30. They are arranged at the closest positions on the upstream and downstream sides, respectively, of the reader (reading position) having the reading white plate 29. The two rollers 28 and 30 perform reading conveyance control. First, a driving gear 204 of the second convey roller 28 is driven from a pinion gear 201 of the driving motor M through an intermediate gear 203 and an intermediate gear 202 which incorporates a clutch mechanism. A driving gear 206 of the original delivery roller 30 is driven from the pinion gear 201 of the motor through an intermediate gear 205 and the intermediate gear 202 which incorporates the clutch mechanism. Only the reading control rollers 28 and 30 arranged at the closest positions on the upstream and downstream sides of the reader are driven by the driving transmission unit on the side of the motor M, thereby implementing precise reading conveyance. The intermediate gear 202 incorporates the clutch mechanism and can start/end transmitting rotation of the pinion gear 201 of the driving motor M to the intermediate gears 203 and 205.

The separation conveyance driving unit 100 will be described with reference to FIG. 8. Broken lines in FIG. 8 indicate the separation roller 26, first convey roller 27, and second convey roller 28. A driving gear 103 of the first convey roller 27 is driven from a second driving gear 101 of the second convey roller 28 through an intermediate gear 102. A driving gear 106 of the separation roller 26 is driven from the driving gear 103 of the first convey roller 27 through intermediate gears 104 and 105. As described above, the separation convey rollers, which do not perform reading control, are driven by the driving transmission unit on the side opposite to the driving motor M. This makes it possible to drive the separation convey rollers without influencing the rollers which perform reading control.

Figure 10:
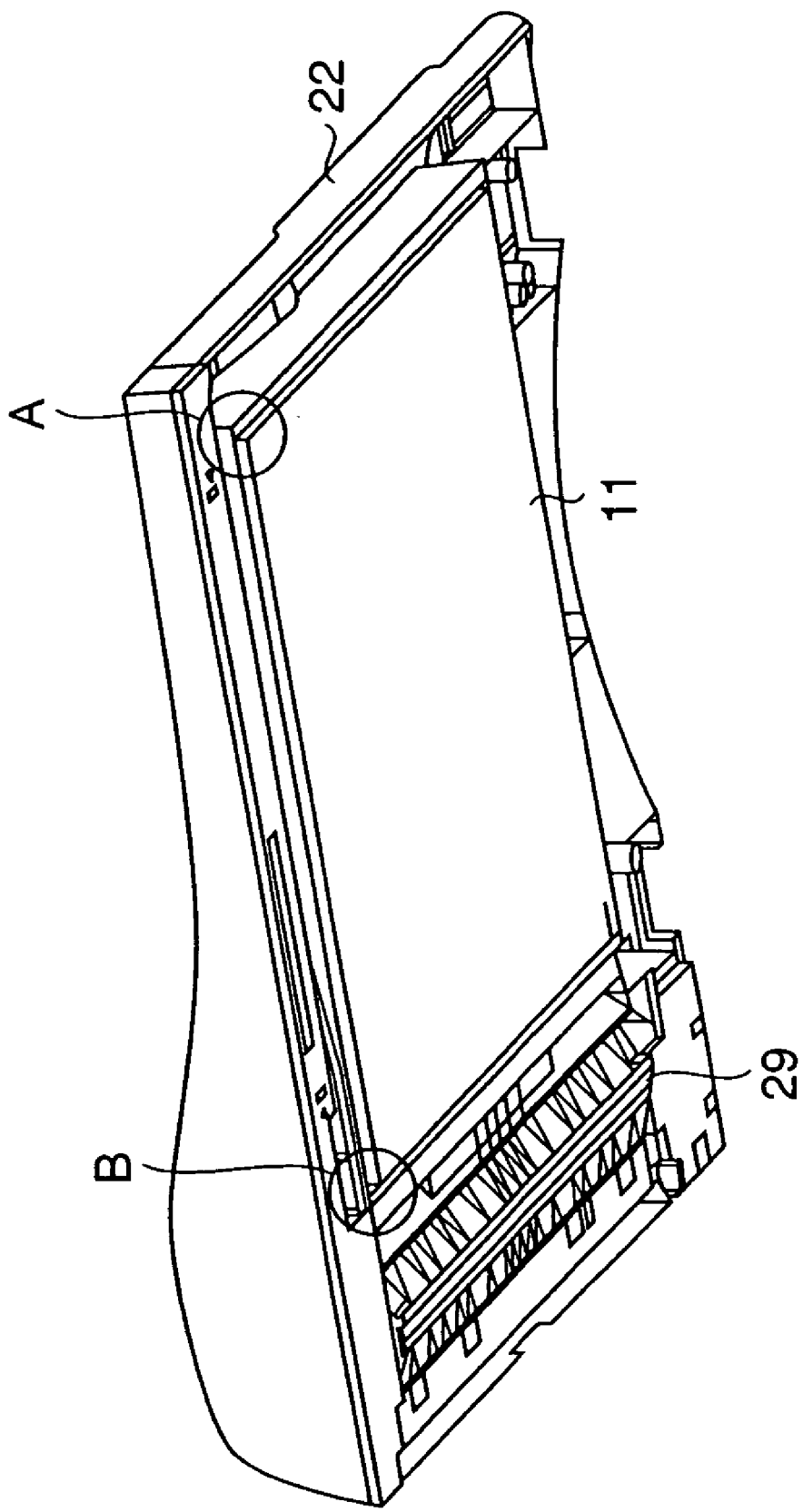
FIG. 10 is a perspective view of the image reading apparatus according to the first embodiment of the present invention.
Figure 11:
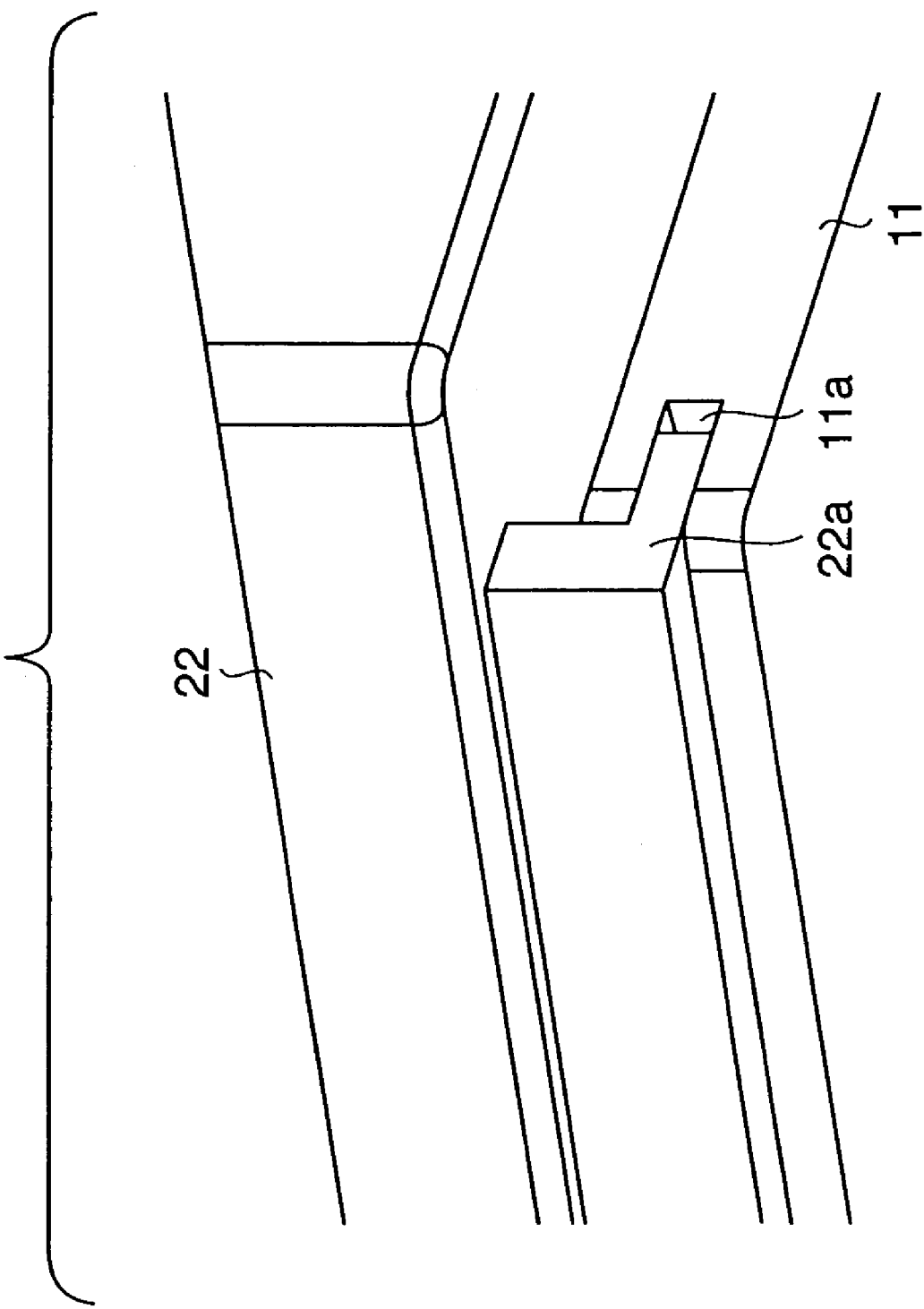
FIGS. 11 and 12 are enlarged perspective views of the image reading apparatus according to the first embodiment of the present invention.
Figure 12:
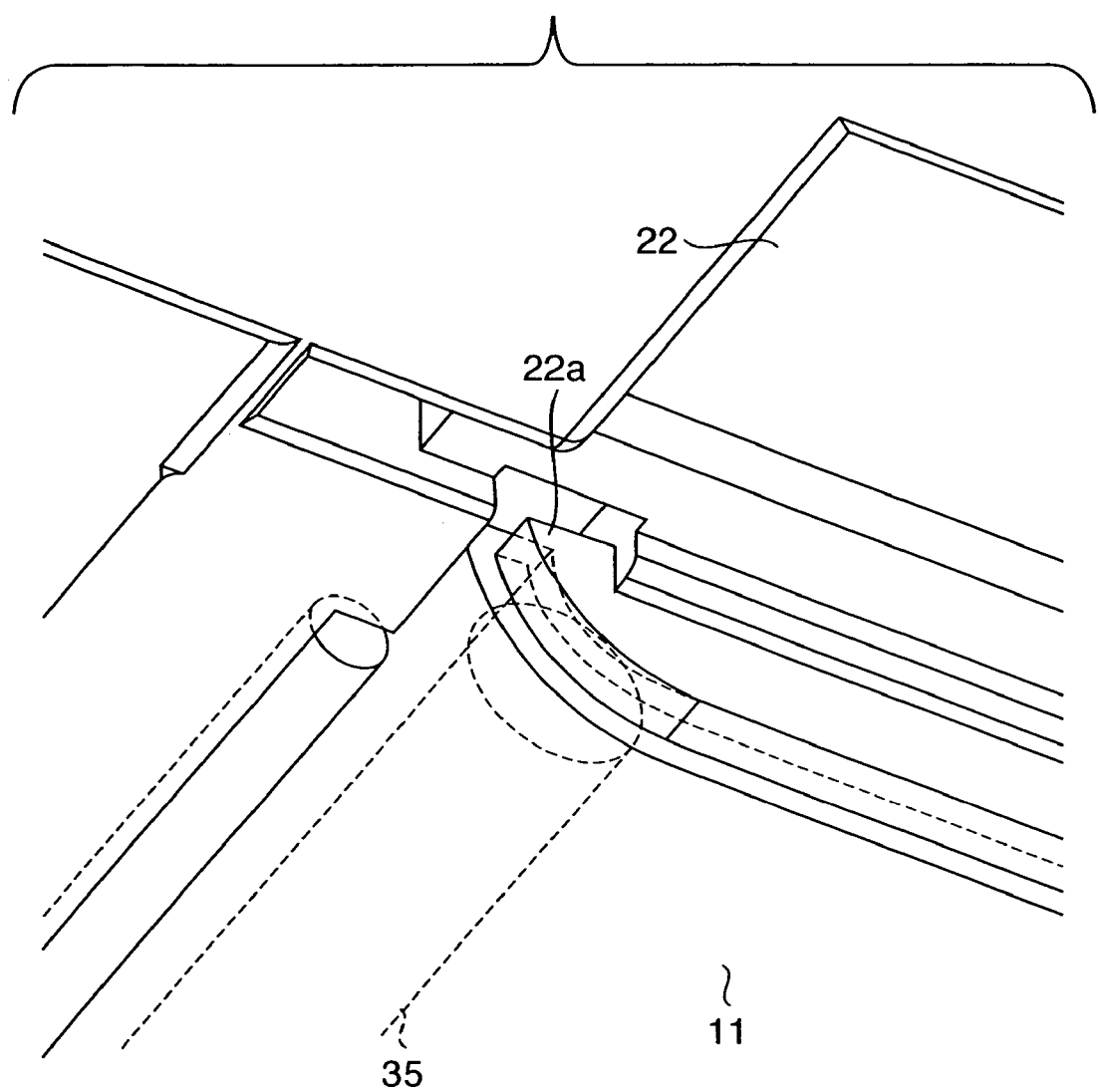

In the image reading apparatus according to this embodiment, the white plate (white sheet) 11 is made of a flexible sheet-like member whose at least one surface is white (e.g., a flexible resin sheet to which a white film is affixed). One end of the white sheet 11 is clamped by white sheet convey rollers 35, as shown in FIG. 2. Notches 11a are formed on the both sides of the white sheet 11, as shown in FIG. 10 and FIG. 11 which shows a portion A of FIG. 10 in an enlarged scale. Rails 22a which guide the notches are formed on the back of the delivered paper loader 22. One end of each rail 22a is so shaped as to guide the white sheet 11 to the white sheet convey roller 35, as shown in FIG. 10 and FIG. 12 which shows a portion B of FIG. 10 in an enlarged scale. The white sheet convey roller 35 is arranged along a direction of width of the surface (upper surface) of the delivered paper loader 22. As shown in FIG. 7, a driving gear 303 of the white sheet convey roller 35 is driven from the pinion gear 201 of the driving motor M through the intermediate gear 202 incorporating the clutch mechanism and intermediate gears 301 and 302. The white sheet convey roller 35 is located at a position where an original sheet delivered by the pair of original delivery rollers 30 does not strike the white sheet convey roller 35.

More specifically, rotating the motor M by a predetermined amount causes the white sheet convey rollers 35 to convey the white sheet 11, which evacuates along the rails 22a on the back of the delivered paper loader 22 to the surface of the delivered paper loader 22 (FIG. 1). The illumination unit 14 incorporated in the delivered paper loader 22 is exposed. Rotating the motor M backward makes it possible to return the white sheet 11 to the original position (FIG. 2).

Even if an edge of the white sheet 11 is attached to and wound by the rollers instead of being conveyed while being clamped by the pair of rollers 35, the same effect can be obtained.

Figure 13:
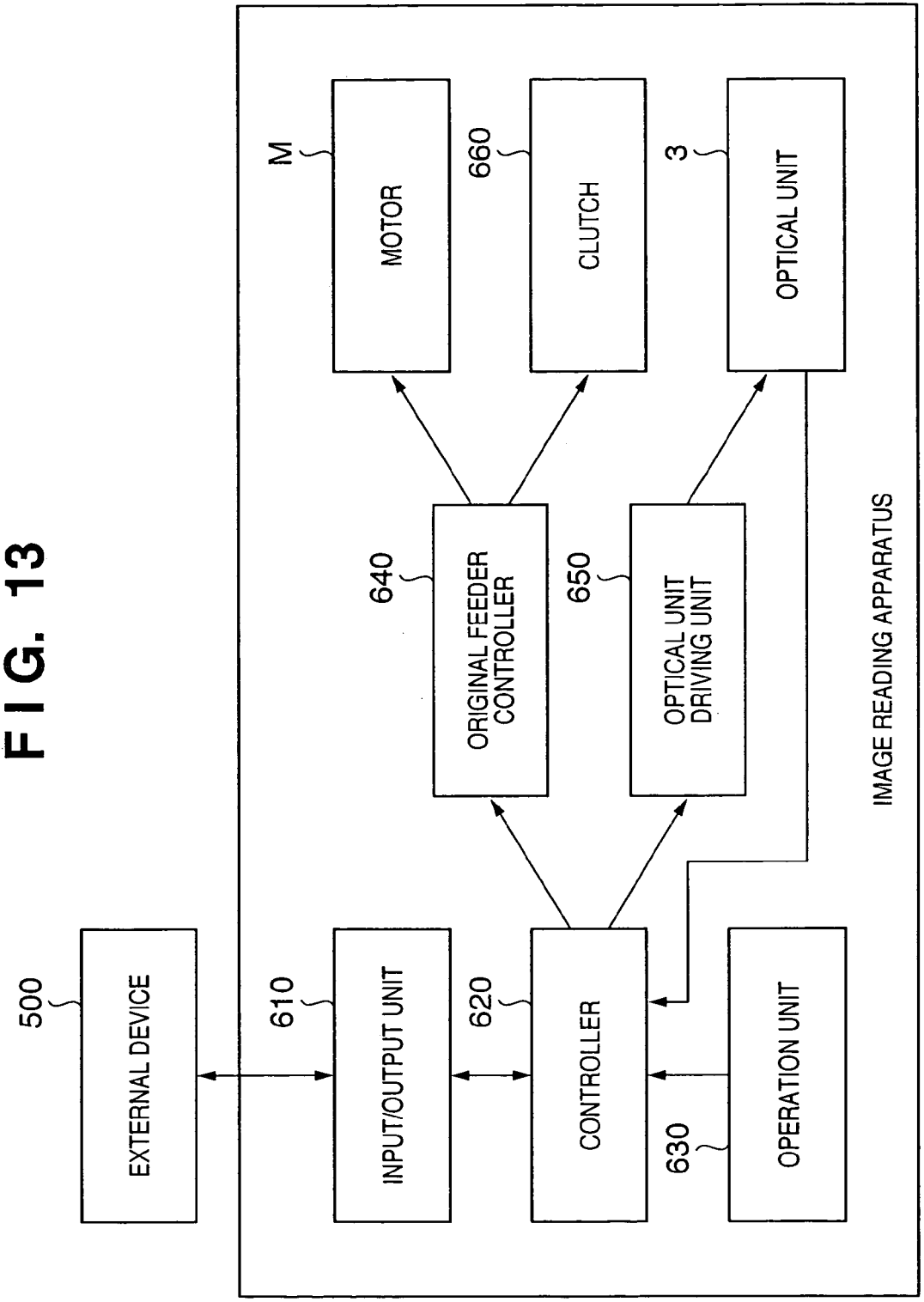
FIG. 13 is a block diagram showing an example of the arrangement of the image reading apparatus according to the first embodiment of the present invention.

FIG. 13 is a block diagram showing an example of main functional arrangement of the image reading apparatus 1 according to this embodiment. The image reading apparatus 1 has an input/output unit 610 for transmitting read data or exchanging data with an external device 500 such as a host computer which uses the image reading apparatus, a controller 620 which controls the entire image reading apparatus 1, an operation unit 630 which has, e.g., keys, buttons, and a touch panel for giving the user's instructions to the image reading apparatus 1, an original feeder controller 640 which controls the operation of the original feeder 20 in accordance with an instruction from the controller 620, an optical unit driving unit 650 which moves the optical unit 3 in accordance with an instruction from the controller 620, the motor M of the original feeder 20, and a clutch mechanism 660 of the intermediate gear 202. The controller 620 includes, e.g., a ROM which stores a control program, a CPU which executes the control program, and a work RAM. The controller 620 controls the units in accordance with the control program, thereby controlling the operation of the image reading apparatus 1.

Figure 14:
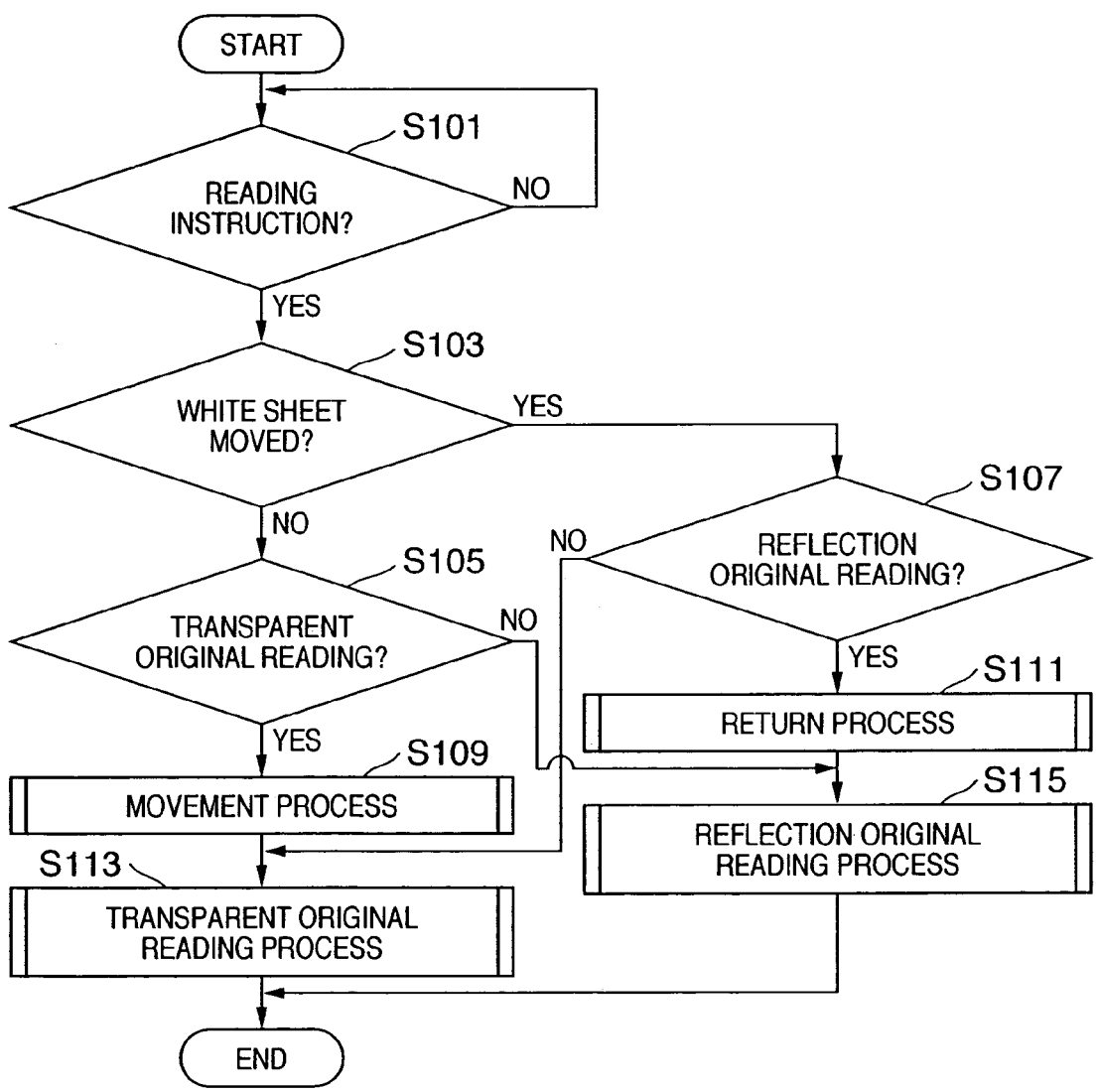
FIG. 14 is a flowchart for explaining the operation of the image reading apparatus according to the first embodiment of the present invention.

The original reading operation of the image reading apparatus 1 according to this embodiment will further be described with reference to the flowchart shown in FIG. 14.

In the image reading apparatus 1, when the operator gives an instruction to start reading a transparent original such as a film or the like from, e.g., the operation unit 630 or external device 500, the controller 620 detects the reading instruction (S101). The controller 620 checks the current position of the white sheet 11 (S103). If the white sheet 11 has not moved (is located at the position shown in FIG. 2), the flow advances to step S105 to check whether the detected reading instruction is a transparent original reading instruction. Since the instruction is a transparent original reading instruction in this example, the flow advances to step S109 to perform a movement process for the white sheet 11.

More specifically, the controller 620 instructs the original feeder controller 640 to set the clutch mechanism 660 inside the intermediate gear 202 in a state wherein the rotation of the pinion gear 201 of the driving motor M is transmitted to the intermediate gear 301 but is not transmitted to the intermediate gears 203 and 205. The controller 620 also instructs the original feeder controller 640 to rotate the driving motor M by a predetermined amount in a direction which moves the white sheet 11. In response to the instruction, the original feeder controller 640 moves the white sheet 11 to a position where the illumination unit 14 is exposed. At the same time, the original feeder controller 640 moves the optical unit 3 to a transparent original reading position below the transparent original illumination unit 14 (FIG. 1).

To make the operator set a transparent original, a message prompting for original setting is output to, e.g., a display unit of the operation unit 630 or a display device of the external device 500. The operator opens the original feeder 20, which is attached to the upper portion of the image reading apparatus 1 so as to be opened, closed, and pivoted freely. The operator sets a film 10 attached to a film guide 34 above a region of the platen glass 2 which falls within the irradiation range of the exposed illumination unit 14. The operator gives an instruction to complete the setting from the operation unit 630 or external device 500.

When the controller 620 confirms the setting completion instruction, the flow advances to step S113 to perform a transparent original reading process. More specifically, the illumination unit 14 incorporated in the delivered paper loader 22 is turned on to irradiate the film with a light beam, and the optical unit driving unit 650 is controlled to sequentially move the optical unit 3. At the same time, the optical unit 3 inside the original table glass 2 photoelectrically converts a transparent image to obtain image data. When reading of a predetermined range is complete, the process ends. A reflection original light source incorporated in the optical unit 3 is not used to read a transparent original.

On the other hand, if the white sheet 11 has already moved in step S103, and the reading instruction is a transparent original reading instruction, the white sheet 11 need not be moved. Accordingly, reading processing is performed immediately (S103→S107→S113).

If the white sheet 11 has moved, and the reading instruction is a reflection original reading instruction, a return process is performed for the white sheet 11 in step S111. The return process is the same as the movement process described in step S109 except that the motor M rotates in the reverse direction.

In step S115, a reflection original reading process is performed. To read a reflection original using the original feeder 20, the controller 620 instructs the original feeder controller 640 to set the clutch mechanism inside the intermediate gear 202 in a state wherein the rotation of the pinion gear 201 of the motor is transmitted to the intermediate gears 203 and 205 but is not transmitted to the intermediate gear 301. After that, the controller 620 instructs the original feeder controller 640 to perform original conveyance. The controller 620 controls the optical unit driving unit 650 to fix the optical unit 3 at a reading position. The reflection original light source irradiates the original to read a reflection image. When all original sheets are read, the process ends.

As described above, when a reflection original is to be read using the original feeder 20, driving to the white sheet convey rollers 35 is blocked. When the original is conveyed, the white background 11 is not moved.

If the white sheet 11 has not moved, and the reading instruction is a reflection original reading instruction in step S103, the white sheet 11 need not be returned. Accordingly, reading processing is immediately performed (S103→S105→S115).

This embodiment has described a case wherein the return process is not performed for the white sheet 11 after the transparent original reading process. The same return process as in step S111 can be performed after step S113. In this case, the white sheet 11 always remains still at the start of the reading process, and the processes in steps S103, S107, and S111 in FIG. 14 are unnecessary.

According to this embodiment, the white background 11 is made of a flexible sheet-like member and is conveyed using the driving source of the automatic feeder. With this arrangement, the user need not attach/detach the white background, and the convenience increases. Since the white background is not removed, contamination of the white background is prevented. Also, the movement amount of the white background 11 is minimized, and the time required for movement becomes short.

Note that the present invention includes a case wherein the equivalent functions are achieved by supplying a software program that implements the functions of the aforementioned embodiment directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiment may be implemented not only by executing the readout program code by the computer but also by some or all of actual processing operations executed by an OS or the like running on the computer on the basis of an instruction of that program.

Furthermore, the functions of the aforementioned embodiment may be implemented by some or all of actual processes executed by a CPU or the like arranged in a function extension board or a function extension unit, which is inserted in or connected to the computer, after the program read out from the recording medium is written in a memory of the extension board or unit.

Second Embodiment

Figure 3:
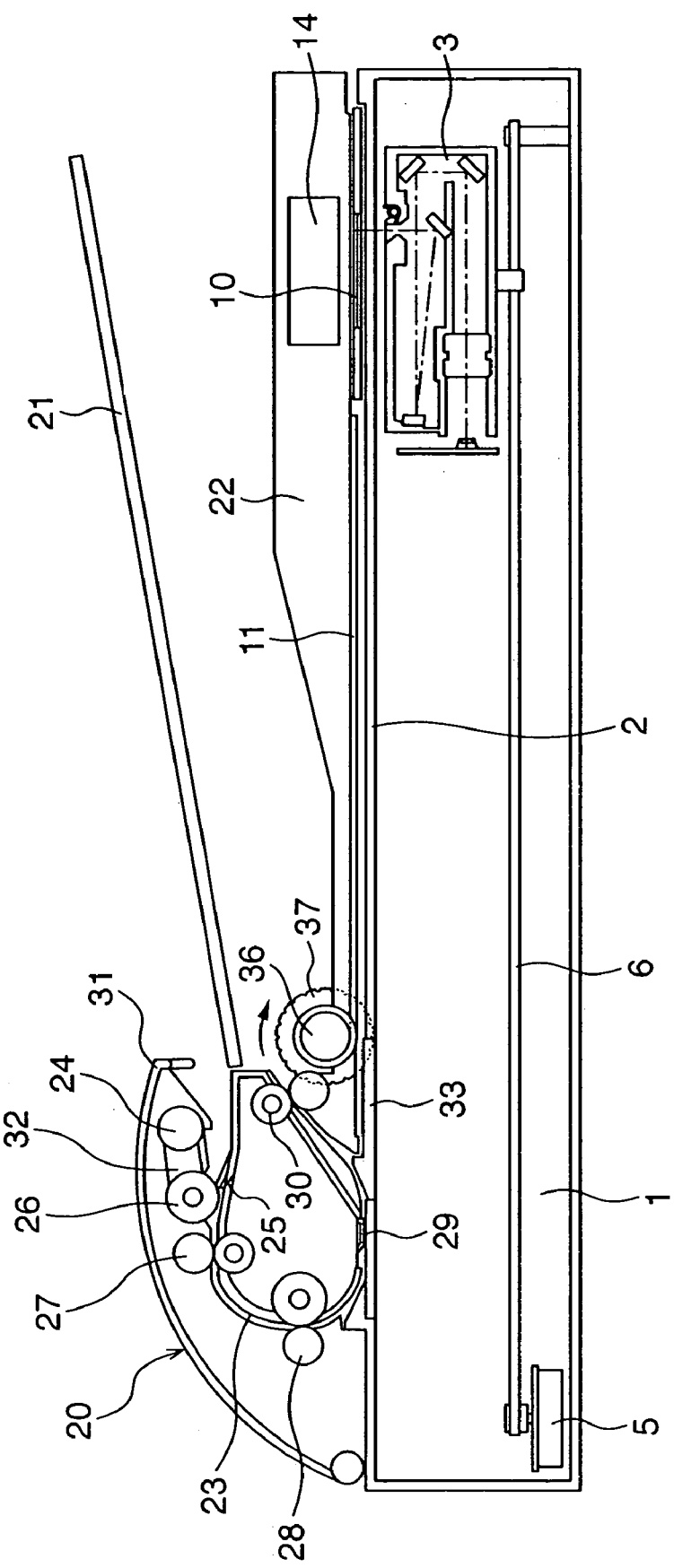
FIG. 3 is a schematic sectional view of an image reading apparatus according to the second embodiment of the present invention.
Figure 4:
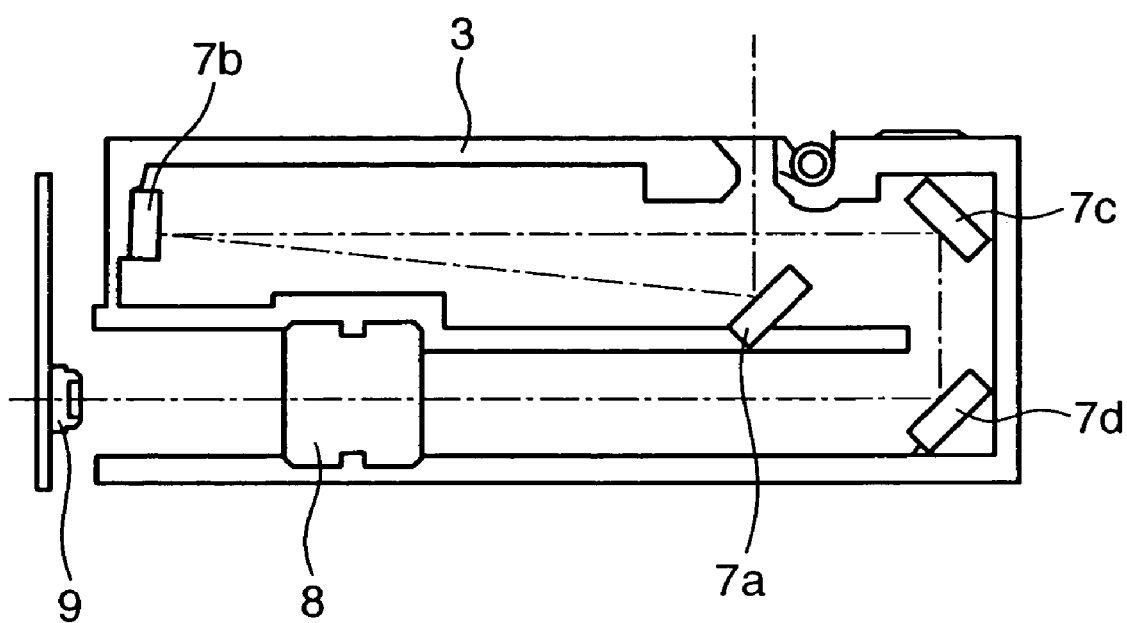
FIG. 4 is a schematic sectional view of an optical unit of an image reading apparatus according to an embodiment of the present invention.

FIG. 3 is a view showing an example of the structure of an image reading apparatus according to the second embodiment of the present invention.

The second embodiment is different from the first embodiment in that a white sheet 11 is not moved by the power of an original feeder 20 but moved manually. The remaining structure and operation of the second embodiment are the same as the first embodiment, and a detailed description thereof will be omitted.

More specifically, a winding roller 36 which winds the white sheet 11 and a knob 37 concentric with the winding roller 36 are provided instead of the pair of white sheet convey rollers 35, as shown in FIG. 3. One end of the white sheet 11 is attached to the winding roller 36. By rotating the knob 37 in a direction indicated by an arrow, the white sheet 11 can be moved and wound round the winding roller 36, thereby exposing an illumination unit 14.

If the user wants to scan a transparent original such as a film or the like, the following operation is performed instead of removing the white sheet 11. More specifically, the knob 37 is rotated, and the white sheet 11 is moved. The illumination unit 14 is exposed to perform reading. To read a reflection original, by rotating the knob 37 backward, the white sheet 11 can be returned to the original position.

According to this embodiment, since the white sheet 11 need not be detached, contamination of the white background which may be caused by detachment can be prevented. Since no driving source is necessary, this embodiment can easily be applied to an image reading apparatus without any original feeder.

According to this embodiment, no motor is used as a means for moving the white sheet 11. Even a reading apparatus without any original feeder as shown in FIG. 9 can implement the present invention. By providing rails 22a which guide the notches also on the back of an original platen 13 and providing the winding roller 36 and knob 37 for the original platen 13, the white sheet 11 can be moved.

Embodiment of Image Printing Apparatus

Each above-mentioned image reading apparatus according to the present invention can be used alone or can be incorporated in another apparatus. As an example of the other apparatus, there is an image printing apparatus comprising an image printing means for reading an image of an original by the image reading apparatus as the first or second embodiment and printing an image on a printing member on the basis of the read image information. More specific examples are a printer, facsimile apparatus, copying apparatus, and the like.

As the image printing means, an electrophotographic image printing means, ink-jet image printing means, or the like can be used. However, the present invention is not limited to this, and any other suitable image printing means can be used.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-013104 filed on Jan. 21, 2004, which is hereby incorporated by reference herein.

What is claimed is:

1. An image reading apparatus which can read a reflection original and a transparent original, said apparatus comprising:

an original table;

an original pressure unit having an illumination unit which can irradiate a predetermined region of said original table;

a sheet member arranged so as to cover a surface on which the illumination unit of said original pressure unit is arranged;

an original feed unit adapted to feed an original;

a conveyance roller which conveys said sheet member to move between a first position where the illumination unit is exposed and a second position where the illumination unit is hidden, wherein the conveyance roller is driven by power from a driving source of said original feed unit; and a rail which guides the movement of said sheet member between the first position and the second position.

2. The image reading apparatus according to claim 1, further comprising a control unit adapted to control said conveyance roller to position said sheet member at the first position when a transparent original reading instruction is issued and to position said sheet member at the second position when a reflection original reading instruction is issued.

3. The image reading apparatus according to claim 1, further comprising a control unit adapted to control power transmission in accordance with a transparent original reading instruction or a reflection original reading instruction such that the power of said original feed unit is selectively transmitted to one of said conveyance roller and said original feed unit.

4. An image printing apparatus which includes an image reading apparatus according to claim 1.

5. The image reading apparatus according to claim 1, wherein said sheet member comprises a notch which is guided by said rail.

6. A control method for an image reading apparatus which can read a reflection original and a transparent original, wherein the image reading apparatus comprises an original table, an original pressure unit having an illumination unit which can irradiate a predetermined region of the original table, an original feed unit adapted to feed an original, conveyance roller which conveys a sheet member, arranged so as to cover a surface on which the illumination unit of the original pressure unit is arranged, and a rail which guides the movement of the sheet member while the sheet member is being moved by the conveyance roller, the method comprising:

a step of causing the conveyance roller to move the sheet member between a first position where the illumination unit is exposed and a second position where the illumination unit is hidden, wherein the conveyance roller is driven by power from a driving source of the original feed unit.

7. The control method according to claim 6, wherein, in the step of moving the sheet member, the conveyance roller is controlled to position the sheet member at the first position when a transparent original reading instruction is issued and position the sheet member at the second position when a reflection original reading instruction is issued.

8. A computer-readable recording medium embodied with a program to be executed, the program comprising a control method for an image reading apparatus defined in claim 6.

* * * * *